United States Patent Office 3,234,062
Patented Feb. 8, 1966

3,234,062
LAMINATING TECHNIQUES
John W. Morris, Tarentum, Pa., assignor to Pittsburgh Plate Glass Company, Pittsburgh, Pa., a corporation of Pennsylvania
No Drawing. Filed Oct. 23, 1961, Ser. No. 147,058
5 Claims. (Cl. 156—104)

This application refers to improved laminating techniques, and specifically refers to an improved method of treating plasticized polyvinyl butyral plastic sheets prior to their lamination and to the improved laminated articles resulting from such treatment.

This invention is particularly concerned with a method for laminating a curved laminated glass assembly comprising two matched sheets of curved glass and a thermoplastic interlayer wherein the interlayer is bonded to the two glass sheets substantially throughout the entire area of the assembly.

Laminated glass assemblies have been developed for various uses, particularly as glazing closures for aircraft and other vehicles. Bent glass-plastic laminates have gained much popularity recently as curved windshields for automobiles.

U.S. Patent No. 2,948,645 to Lawrence A. Keim for Method for Pressing Laminated Glass, issued on August 9, 1960, describes a method of laminating such assemblies typical of the prior art. This prior art method includes the steps of preliminary pressing and subsequently autoclaving to bond completely the laminations of a curved glass-plastic assembly. The assembly produced according to the prior art comprises two sheets of glass of matched curvature and a thermoplastic interlayer therebetween.

The laminating method of the prior art as described in the aforesaid Keim patent involves a preliminary pressing step followed by a final laminating step. The preliminary pressing step comprises enclosing the assembly within an endless channel-shaped member of a fluid impervious material. The channel-shaped member engages the outer surfaces of a marginal portion only of the assembly and is spaced from the periphery of the interlayer to provide a conduit around the margin of the assembly. This method is called the "glass bag" method, because the outermost glass sheets of the assembly cooperate with the channel-shaped member to form a bag enclosing the interfacial portions from which entrapped air is to be removed.

The conduit is then evacuated utilizing a vacuum, such as at least 10 inches of mercury and preferably at least 25 inches of mercury, to remove air from between the interlayer and the glass sheets. The vacuum is thus provided substantially only at the periphery of the assembly or at the periphery and the margin only of the major outer surfaces of the assembly and, of course, at the interfaces between the laminations of the treated assembly.

While at least part of the vacuum is maintained in the conduit, the entire assembly and its surrounding channel-shaped member are heated to an elevated temperature, such as about 150 degrees to 350 degrees Fahrenheit and preferably about 225 degrees to 300 degrees Fahrenheit, for a sufficient length of time to remove entrapped fluid from the interfaces and to seal or bind at least a narrow marginal area of the glass assembly. The step of heating is carried out while the assembly with the channel-shaped member therearound is surrounded by air or gas at substantially atmospheric pressure to seal at least a marginal area according to the teaching of the aforesaid Keim patent. This prepares the assembly for final pressing, but does not necessarily produce the end result, a laminated glass-plastic assembly, unless the special precautions recited herein are followed.

After the preliminary pressing is completed according to the prior art, it is sometimes necessary to improve the seal between the plastic margin and the glass by a technique known as edge rolling. In this treatment, a thin, flexible metal member is inserted between the glass sheets and pressed against the margin of the hot interlayer to thicken the hot margin of the interlayer against which it is pressed as it is moved around the periphery of the assembly or the portions thereof that require improved sealing. This technique is described in U.S. Patent No. 2,999,779, to John W. Morris, for Method and Apparatus for Edge Sealing, which issued on September 12, 1961.

In the final laminating step of the laminating technique of the Keim patent, the assembly is subjected to an elevated temperature and pressure substantially above atmospheric pressure, such as in an autoclave, so as to complete the bond between the interlayer and glass sheets substantially throughout the entire assembly. The prepressing and edge rolling provided by the prior art seals the marginal edge of the assembly to prevent autoclave fluid such as hot oil from penetrating between the laminations of the assembly.

The present invention provides a method of treating the polyvinyl butyral interlayer prior to the preliminary pressing so as to enable the preliminary pressing step of the prior art to serve as a final laminating step. In other words, the preliminary treatment of the plastic provided by the present invention eliminates the necessity for the use of an autoclave and for edge rolling the plastic interlayer periphery in the laminating operation.

Eliminating the use of an autoclave serves the following purposes:

(1) It eliminates the capital expenditures necessary to purchase expensive autoclaves.

(2) It eliminates the cost of the additional labor required for performing the autoclave treatment.

(3) It eliminates the additional losses made possible by the additional handling required for autoclaving.

(4) It eliminates the expense of washing autoclave oil from the surfaces of the assembly after the laminating is completed by the autoclave operation.

(5) It eliminates the cost of reclaiming autoclave oil after the washing operation.

Elimination of the need for edge rolling reduces the labor costs involved in laminating and the possibility of production losses resulting from an additional handling step.

While the present operation will be described particularly and specifically in connection with the lamination of glass-plastic assemblies, it will be understood that the treatment suggested by the present invention eliminates the autoclaving step from the lamination of any pair of transparent sheets of relatively rigid material and a thermoplastic interlayer of relatively flexible polyvinyl butyral.

According to the present invention, the polyvinyl butyral is treated in a special manner before it is assembled between a pair of transparent sheets of rigid material such as glass. Its surfaces are embossed or roughened to provide passages for the escape of air entrapped between layers of the assembled laminate and its moisture content is reduced to substantially less than two parts by weight per thousand parts of interlayer. The moisture content in the interlayer is maintained below two parts per thousand by weight of the plastic while assembling the interlayer between a pair of sheets of the relatively rigid material prior to laminating the interlayer to the pair of sheets at substantially atmospheric pressure.

The laminating can be accomplished without requiring either edge rolling or an oil autoclave, by a method such as described hereinabove as employed in the prior art for prepressing or by another method involving introducing the assembly to be laminated into an envelope or a bag which is evacuated to remove any air from between the bag and its contents and between the interfaces of the assembly followed by heating to elevated temperatures until the laminating is completed. The former method is preferred because there is less loss in handling the assemblies, less material required for the laminating apparatus and assemblies having better optical properties are obtained in the former method than in the latter method.

The standard or usual autoclave treatment that has been eliminated by virtue of this invention utilizes temperatures of about 190 degrees to about 325 degrees Fahrenheit, preferably between about 225 degrees to 300 degrees Fahrenheit, and simultaneously applies pressure, such as between about 100 and 250 pounds per square inch, and preferably between about 175 to 225 pounds per square inch. The time of treatment depends upon these conditions.

In order to illustrate the benefits of the present invention, the details of various experiments first with flat glass-plastic assemblies and subsequently with curved glass-plastic assemblies will be described in order to indicate how the present invention avoids the necessity for the conventional autoclave treatment.

Two basic methods were used to laminate flat plate glass successfully without autoclave final pressing. The first two examples hereinbelow will describe the results obtained from prior art preliminary pressing of assemblies including a plastic interlayer treated in the manner suggested herein with other assemblies not so treated.

All glass used in this work was flat polished plate glass 24 inches long by 24 inches wide by ⅛ inch nominal thickness.

Some polyvinyl butyral sheets were hung in a conditioning room maintained at 70 degrees Fahrenheit and 10 percent relative humidity for several weeks before the experiments. The moisture content of the plastic sheet conditioned in this manner was between 0.1 percent and 0.2 percent by weight of the polyvinyl butyral or less than 2 parts per thousand by weight based on polyvinyl butyral.

*Example 1*

A plasticized polyvinyl butyral sheet, which was stored several weeks at 70 degrees Fahrenheit and 10 percent relative humidity, was sandwiched between a pair of glass sheets in an assembly room where the temperature and pressure were maintained at the conditions at which the sheet was stored. This storage treatment reduced the moisture content in the plasticized polyvinyl butyral sheet to a maximum of 0.2 percent by weight or 2 parts per thousand by weight of the interlayer.

After the glass plastic assembly was assembled, flexible rubber tubing was split lengthwise and applied around the entire periphery of the assembly with the split ends of the tubing overlapping the opposite outer surfaces of the assembly and the main body of the split tubing spaced from the marginal edge of the assembly to form an evacuation chamber. The evacuation chamber surrounding the assembly was subjected to evacuation of 28 inches of mercury for 15 minutes at room temperature. After this evacuation, the evacuated assembly was placed in the 300 degree Fahrenheit oven for 15 minutes while maintaining the vacuum. The oven was at substantially atmospheric pressure.

After the assembly was removed from the oven, the channel was removed from the assembly and the assembly allowed to cool and was inspected for optical clarity. One hundred percent of the area of a sample which had been treated in the above manner was clear.

Three other assemblies having untreated plasticized polyvinyl butyral interlayers were treated in a similar manners without any steps taken to reduce the moisture content of the polyvinyl butyral sheeting. These 3 latter samples were subjected to a peripheral evacuation through the marginal channels for 15, 20, and 25 minutes, respectively while exposed to substantially atmospheric pressure. The percentage of clear area in these 3 latter samples was 70 percent, 80 percent, and 75 percent, respectively. The surfaces of the plastic sheets tested above were all embossed.

In subsequent tests performed with 14 additional sample assemblies comprising polyvinyl butyral interlayers stored in the controlled temperature and humidity environment described above to reduce their moisture content to a maximum of 0.2 percent by weight, 6 assemblies had plastic interlayers whose surfaces were randomly embossed and 8 assemblies had plastic interlayers with 1 surface randomly embossed and the other surface provided with parallel shallow grooves. Table I below lists the vacuum applied to the peripheral evacuation chamber in inches of mercury and the duration of evacuation prior to a 15 minute oven treatment at 300 degrees Fahrenheit while maintaining the vacuum, and whether both surfaces were randomly embossed or 1 surface provided with shallow grooves and the other randomly embossed.

TABLE I

| Vacuum (Inches of Mercury) | Vacuum Time Before Heating (Minutes) | Percent of Assembly Clear After Treatment | Both Surfaces Randomly Embossed | One Surface Parallel Grooved |
|---|---|---|---|---|
| 27 | 17 | 100 | (*) |  |
| 26 | 10 | 98 | (*) |  |
| 26 | 17 | 100 | (*) |  |
| 28 | 15 | 95 | (*) |  |
| 27 | 10 | 95 | (*) |  |
| 27 | 10 | 100 | (*) |  |
| 27 | 10 | 100 |  | (*) |
| 27 | 10 | 100 |  | (*) |
| 27 | 15 | 100 |  | (*) |
| 27 | 15 | 100 |  | (*) |
| 27 | 15 | 100 |  | (*) |
| 27 | 15 | 100 |  | (*) |
| 27 | 15 | 100 |  | (*) |
| 26 | 15 | 100 |  | (*) |

The above experiment indicated the possibility of utilizing the so-called "glass bag" process which previously had been limited to the preliminary pressing of laminated assemblies as a final laminating step at substantially atmospheric pressure provided the moisture content of the plastic interlayer was suitably controlled and the surfaces of the plastic interlayer suitably embossed to provide paths of escape for the entrapped air.

*Example II*

Another series of assemblies were laminated utilizing the so-called "plastic bag" method. In these experiments the glass-plastic assemblies were first assembled by mounting the polyvinyl butyral sheet on an upper surface of a glass sheet and then mounting the other glass sheet of the assembly on the upper surface of the polyvinyl butyral sheet. The assembly was then placed in a plastic bag. The bag was exposed to substantially atmospheric pressure while its interior was evacuated for 15 minutes at room temperature and the opening through which the evacuation took place sealed by heat.

The assembly enclosed within the sealed bag was then placed in an oven maintained at a temperature of 300 degrees Fahrenheit and at substantially atmospheric pressure for 15 minutes. The assembly was removed from the oven while within the bag and allowed to cool and removed from the bag for inspection purposes.

Five assemblies were tested in the original test, two having interlayers with low moisture content, and three with interlayers having high moisture content. Over 95 percent of the area of the 2 assemblies with interlayers having low moisture content was clear upon inspection. Of the other 3 assemblies having plastic interlayers whose moisture content was not controlled, 2 had no clear area whatsoever and the third assembly was clear in only 50 percent of its area. This prompted another test of samples having interlayers with moisture content of only 0.2 percent by weight of the interlayer to test the present invention's feasibility using the so-called "plastic bag" method of pressing.

Of 13 other samples having 0.2 percent moisture content in the plastic interlayer that were tested to prove the effectiveness of the "plastic bag" method, 2 of the units had only 40 percent area clear and another unit had no clear area. However, these units were spoiled because of failure of the plastic bag in the oven, a factor that reduces the efficiency of the "plastic bag" method. Table II tabulates the results obtained for those assemblies laminated by this method in which no observable failure of the plastic bag occurred. All these latter units tested had plasticized polyvinyl butyral interlayers that were randomly embossed on one surface and provided with shallow parallel grooves on the other surface.

TABLE II

| Vacuum (Inches of Mercury) | Vacuum Time Before Heating (Minutes) | Percent of Assembly Clear After Treatment |
|---|---|---|
| 22 | 5 | 100 |
| 25 | 5 | 100 |
| 25 | 5 | 100 |
| 23 | 5 | 100 |
| 25 | 2 | 100 |
| 21 | 2 | 95 |
| 23 | 5 | 100 |
| 21 | 2 | 50 |
| 22 | 5 | 100 |
| 25 | 10 | 100 |

*Example III*

After processing the assemblies as described in Examples I and II above, those panels which did not press totally clear were subjected to an additional oven treatment at 300 degrees Fahrenheit and substantially atmospheric pressure for various time periods. Only those laminates which were processed with very dry plastic interlayers and which had 90 percent clear area after the initial processing cleared entirely in the additional oven treatment.

Thirty minutes treatment at 300 degrees Fahrenheit substantially atmospheric pressure was sufficient to completely clear the entire area of most of these assemblies, although up to an hour was needed for several. Those laminates which had less than 90 percent of their area clear after the initial processing displayed some clearing in the extra oven treatment, but in general did not clear entirely and usually developed many small bubbles.

*Example IV*

Sixty assemblies completely clear throughout their entire area were assembled. Their dimensions were 12 inches by 12 inches. Thirty of these were laminated by the so-called "glass bag" technique and the other 30 by the so-called "plastic bag" technique. Each set of 30 assemblies was heated to 300 degrees Fahrenheit during the evacuation of the "glass bag" or "plastic bag" until all areas were cleared to give a 100 percent clear area.

Fifteen assemblies of each set of 30 formed a subgroup subjected to a typical commercial autoclaving cycle. These 30 assemblies were inserted into an oil-autoclave at room temperature (about 75 degrees Fahrenheit). The oil pressure was increased to 200 pounds per square inch and the oil-autoclave heated for 20 minutes to a temperature of 275 degrees Fahrenheit. This temperature was held for 20 minutes and then the autoclave was cooled for a period of 15 to 18 minutes until the oil temperature had been cooled to 125 degrees Fahrenheit and the assemblies were removed and washed.

Each subgroup of 15 was divided into 5 groups of 3 assemblies each for each of 5 different tests.

In the first test, 12 assemblies, 3 from each subgroup, were subjected to a 2 hour boil test by immersion for 2 hours in boiling water. There were no bubbles in any of laminates tested after their immersion in boiling water for 2 hours. This indicated that all the assemblies passed the heat stability test.

Another dozen assemblies were subjected to a so-called progressive oven test. In this test, 3 assemblies from each subgroup were placed in an oven maintained at 150 degrees Fahrenheit and subjected to temperature increases of 25 degrees Fahrenheit every 15 minutes until bubbling occurred. All the assemblies began to bubble at 425 degrees to 450 degrees Fahrenheit, except for one which bubbled at 350 degrees Fahrenheit which was subjected to the evacuation and heat-treatment while inserted in a plastic bag and which was not subjected to an autoclave operation subsequently. This indicated that the final pressing in oil did not improve the heat stability of the laminates appreciably.

Another set of 12 assemblies, 3 from each sub-group, was subjected to a ball-drop test in which a steel ball weighing one half pound was dropped from a height of 18 feet onto each assembly maintained at 0 degrees Fahrenheit overnight prior to this test. All the assemblies produced by the "glass-bag" method held the ball, regardless of whether the treatment was followed by an oil-autoclave operation. Of those laminated by the "plastic-bag" method, 1 of the 3 that was not subjected to autoclaving held the ball and 1 of the 3 that was subjected to autoclaving held the ball. This indicates that the impact strength of the laminated assemblies is not affected by autoclaving.

Another dozen laminates, 3 of each subgroup, were exposed to 0 degrees Fahrenheit overnight and the following morning were removed from the 0 degrees Fahrenheit atmosphere and immediately hammered over their entire area to determine the adhesion of glass to the plastic interlayer at 0 degrees Fahrenheit. In all 12 assemblies tested in this manner, the entire plastic interlayer was covered with splintered glass after this operation. There was no observable difference between assemblies that were not subjected to the oil-autoclaving compared to those that were.

The final 12 assemblies were exposed for a 2 week period in an atmosphere maintained above 95 percent relative humidity and at 120 degrees Fahrenheit. At the end of the 2 week period, there was only slight moisture penetration not above $1/16$ inch in several samples. Upon drying, only a few small edge bubbles formed in several assemblies. There was no continuous edge shrinkage in any of the 12 assemblies tested.

From these tests, it was concluded that the laminates containing the plastic interlayers treated in accordance with the present invention easily meet the requirements of the American Standards Association Code for Safety Glazing Materials Z-26.1—1950, even though the laminated assemblies are not autoclaved.

Having determined the feasibility of eliminating the oil-autoclave for flat laminates, it was decided to run a production run on a regular curved windshield. The details of this operation are described in the following example.

*Example V*

Plasticized polyvinyl butyral sheeting was dried in a vacuum chamber 30 inches in diameter and approximately 7 feet long. The chamber was heated by electrical strip heaters located immediately surrounding the chamber. The temperature was held at 135 degrees Fahrenheit inside the chamber and the chamber was evacuated to a vacuum of about an average 28 inches of mercury maintained within the chamber. Two sheets of plastic were placed on each of 6 shelves and allowed to remain within the chamber for 1 hour. The moisture content of the plastic, after the 1 hour drying period, was between .10 percent and .15 percent by weight based on the weight of the interlayer.

After the dried plastic was removed from the drying chamber, the windshields were then assembled and a peripheral channel applied. A vacuum of 27 inches of mercury was maintained on the peripheral channel for a period of 10 minutes at room temperature.

The sheets were then conveyed through an oven maintained at substantially atmospheric pressure and an oven temperature averaging 345 degrees Fahrenheit. The peripheral vacuum of 27 inches mercury was maintained on each assembly during the entire period of 15 minutes during which the assembly was exposed to the oven temperature and substantially atmospheric pressure. During the 15 minutes of exposure the plastic interlayer between the glass sheets reached a temperature of 300 degrees Fahrenheit. The windshields were removed from the oven, the marginal channel members removed and the windshields were inspected for unlaminated spots.

This test run involved 114 assemblies. Of these 114 assemblies, 83 were completely free of unpressed spots, 21 additional assemblies had very small unpressed spots located within ¼ inch from the edge of the glass, and only 10 assemblies had spots within the vision area of the windshield. Therefore, the test run had a yield of 91 percent of commercially acceptable windshields.

It was concluded from the above production run that oil-autoclaving is not necessary to complete lamination of properly bent pairs of glass sheets, provided the polyvinyl butyral plastic interlayer is maintained dry and has a surface treated to permit easy evacuation of air entrapped between the laminations during the assembly thereof.

While the explanation for this is not absolutely certain, it has been theorized that peripheral evacuation produces a subatmospheric pressure on the interfaces between the laminations of the main body of the assembly capable of removing the entrapped air and a limited amount of water vapor. However, if there is more than 0.2 percent by weight of moisture in the plastic interlayer, it becomes necessary to apply a greater pressure than that which is possible by evacuation, namely super-atmospheric pressure is needed to permanently incorporate the moisture in the plastic interlayer. It is believed that the failure of the prior art to appreciate this problem is the reason why edge rolling and autoclaving was deemed necessary.

While a specific embodiment has been described in terms of treating glass-plastic laminates so as to eliminate the autoclaving step regarded as necessary before this invention, it is understood that transparent rigid materials other than glass may be laminated to polyvinyl butyral plastic utilizing the techniques taught herein of maintaining the plastic relatively free from moisture content. Examples of plastic materials suitable for lamination are the acrylates, organosilicons, polystyrene plastics, vinyl copolymers, cellulose esters, etc. Polymerized methyl methacrylate resin has wide use in laminates used in aircraft glazing wherein the interlayer of polyvinyl butyral is used to be bonded to the relatively rigid sheets of the plastic.

The heating treatment for drying the plasticized polyvinyl butyral sheet should be performed at a temperature close to but not exceeding 140 degrees Fahrenheit. Higher temperatures cause the plastic to shrink. Lower temperatures require the drying treatment to be too long for efficient commercial operation. Evacuating the environment in which the plastic sheets are heated promotes rapid drying.

While the plastic may be dried by storage in a room of controlled atmosphere of very low humidity (less than 10 percent) for a period of several weeks, it has been found to be more practical to use a heat treatment such as described above to reduce the moisture content of the interlayers and store the dried interlayers in a chamber of controlled humidity and temperature—20 percent relative humidity and about 70 degrees Fahrenheit until the laminate is assembled.

The description above is for the purpose of illustration rather than limitation. Reference to the latter may be obtained from the claimed subject matter which follows.

What is claimed is:

1. In the art of fabricating a laminated assembly having a polyvinyl butyral interlayer sandwiched between a pair of transparent sheets of material relatively rigid compared to said interlayer, the improvement comprising reducing the moisture content of said interlayer to substantially less than two parts by weight per thousand parts of interlayer and maintaining the moisture content of said interlayer below two parts per thousand while assembling said interlayer between said pair of sheets prior to laminating said interlayer to said pair of sheets and laminating said assembly at substantially atmospheric pressure while continuing to maintain the moisture content of said interlayer below two parts by weight per thousand parts of interlayer until the laminate so produced is capable of meeting the requirements of the American Standards Association Code for Safety Glazing Materials Z–26.1—1950, without requiring any additional treatment at superatmospheric pressure.

2. The improvement according to claim 1, wherein said interlayer is exposed to a dry atmosphere maintained at a subatmospheric pressure while said moisture content is being reduced.

3. The improvement according to claim 1, wherein said interlayer is heated to a temperature not exceeding about 140 degrees Fahrenheit during said moisture content reduction.

4. A method of laminating a glass-plastic assembly comprising assembling a dry sheet of polyvinyl butyral having a moisture content of less than 2 parts per thousand by weight based on polyvinyl butyral and two matched sheets of glass in aligned stacked relation to one another so that the sheet of polyvinyl butyral is sandwiched between said glass sheets in said assembly and becomes an interlayer thereof, maintaining said sheet of polyvinyl butyral dry during said assembly step, enclosing the periphery and the margin only of the assembly with a flexible, channel-shaped member made of a fluid impervious material to place the member in engagement with a marginal portion of the outer surfaces of the assembly and in spaced relation to at least part of the periphery of the assembly to provide a conduit adjacent the periphery of the interfaces between the interlayer and the glass sheets, evacuating air from the conduit through the member to remove air from between the interlayer and the glass sheets, and heating the assembly and the material enclosing it to an elevated temperature while subjecting said assembly and said enclosing material to a maximum pressure substantially equal to atmospheric pressure to bond the interlayer to each glass sheet while continuing to evacuate air from said conduit until the laminate so produced is capable of meeting the requirements of the American Standards Association Code for Safety Glazing Materials Z–26.1—1950, without requiring any further treatment at superatmospheric pressure.

5. The method according to claim 4, wherein said plasticized polyvinyl butyral sheet is heated in an evacuated environment for a period not exceeding one hour at a temperature not exceeding 140 degrees Fahrenheit to reduce said moisture content before performing said assembling step.

References Cited by the Examiner

UNITED STATES PATENTS

| | | | |
|---|---|---|---|
| 2,205,020 | 6/1940 | Ryan | 154—2.77 |
| 2,360,650 | 10/1944 | Crane | 154—2.77 |
| 2,534,102 | 12/1950 | Buckley et al. | 161—199 |
| 2,948,645 | 8/1960 | Keim | 156—104 |

ALEXANDER WYMAN, *Primary Examiner.*

EARL M. BERGERT, *Examiner.*